United States Patent [19]

Geiger

[11] Patent Number: 4,645,173

[45] Date of Patent: Feb. 24, 1987

[54] DEVICE FOR CLAMPING A MACHINE TABLE OR THE LIKE ON A MACHINE BED

[75] Inventor: Michael Geiger, Starnberg, Fed. Rep. of Germany

[73] Assignee: Friedrich Deckel Aktiengesellschaft, Munich, Fed. Rep. of Germany

[21] Appl. No.: 475,438

[22] Filed: Mar. 15, 1983

[30] Foreign Application Priority Data

Mar. 16, 1982 [DE] Fed. Rep. of Germany ....... 3209553

[51] Int. Cl.[4] .............................................. F16M 5/00
[52] U.S. Cl. .................................... 248/680; 248/500
[58] Field of Search ............... 248/680, 681, 646, 500; 269/309, 63

[56] References Cited

U.S. PATENT DOCUMENTS

| | | | |
|---|---|---|---|
| 2,904,288 | 9/1959 | Krauss et al. | 248/681 |
| 3,312,510 | 4/1967 | Brehm | 269/309 X |
| 3,420,042 | 1/1969 | Kaufman | 248/646 X |
| 3,986,617 | 10/1976 | Blomquist | 414/749 |
| 4,029,275 | 6/1977 | Erismann | 248/500 X |
| 4,211,178 | 7/1980 | Peterson | 248/680 X |
| 4,275,939 | 6/1981 | Odermann | 248/680 X |

*Primary Examiner*—Ramon O. Ramirez
*Attorney, Agent, or Firm*—Flynn, Thiel, Boutell & Tanis

[57] ABSTRACT

The invention relates to a device for clamping of a machine table or a pallet on a machine bed or frame, whereby the machine table rests at several bearing points on support pins or the like which are arranged on the machine frame. The clamping force is applied by one single, central clamping device, which engages approximately in the center of a plate, which in turn is coupled in the area of the bearing points on the underside of the machine table. The plate serves to transmit the centrally applied tensioning force into the area of the support of the machine table in order to avoid bending or distortion to the machine table.

7 Claims, 5 Drawing Figures

DEVICE FOR CLAMPING A MACHINE TABLE OR THE LIKE ON A MACHINE BED

FIELD OF THE INVENTION

The invention relates to a device for releasably coupling a work table to a machine frame without distorting the work table at the points of securement to the machine frame.

BACKGROUND OF THE INVENTION

The construction of machine tables related to the invention disclosed herein are used mainly in change tables or pallets for use with processing centers or similar machines. The bearing surfaces of the machine tables or pallets and the support surfaces of the machine bed or frame are precision worked and in most cases additionally adjustable, so that the successively changed pallets assume at all times an exactly, reproducible position on the machine bed or frame. The bearing surfaces or rather support surfaces can moreover engage positively, so that they also absorb the forces which act onto the machine table in the table plane.

To prevent all forces from lifting the machine table off from the machine bed, the machine table is clamped onto the machine bed. One or several clamping devices are as a rule used for this, which members engage anywhere on the machine table and pull same toward the machine bed. However, a risk exists, primarily when between the bearing surfaces and the point of engagement of the clamping device or devices, there exist larger distances, that the machine table will bend or be distorted in the area of the clamping device and through this forms an inexact bearing surface for the workpiece fastened thereon.

A certain remedy can be achieved by distributing the entire tensioning or clamping force to as many as possible, each lightly loaded clamping devices so that in this manner the forces which act locally onto the machine table are kept small. From this results, however, primarily in the case of automatic clamping systems, a substantial amount of structural and technical control development and thus a very expensive mode of construction.

It is the purpose of the present invention to provide a device which permits with simple means a secure, deformation-free clamping of a machine table to a machine frame.

The inventive construction facilitates a clamping function with one single clamping device, even on larger machine tables. The centrally applied clamping force does not engage directly the actual table member, but is guided through the transmitting means substantially near the bearing surfaces, where they can be absorbed deformation-free by the support surfaces.

The transmitting means can be designed in any desired manner such that it distributes the centrally applied clamping force at an optimum to the bearing surfaces. A particularly simple and inventive design results if they are formed by a plate, which at least in the area of the bearing surfaces is connected to the underside of the machine table, while in their center area there is provided a device for the engagement of the clamping device.

A preferred embodiment provides that the plate is constructed as a circular disk, which is secured with its outer edge on the machine table and that it has an opening in its center, into which opening the clamping device, for example with an enlarged head which is automatically rotatable during the clamping or releasing movement, engages in a bayonetlike manner.

In a different exemplary embodiment, the circular disk is radially slotted, whereby the clamping device is provided with an enlarged head which extends over the lateral edges of the slot. In this solution, the machine table can be swung laterally into its operating position.

The plate or rather circular disk can be constructed basically in one piece with the machine table; however, it is constructed preferably as a separate structural part and is connected to the machine table through screws or similar fastening means.

BRIEF DESCRIPTION OF THE DRAWINGS

Several exemplary embodiments of the invention are illustrated in the drawings and will be described in greater detail hereinbelow.

DETAILED DESCRIPTION

Figures 1A, 1B:
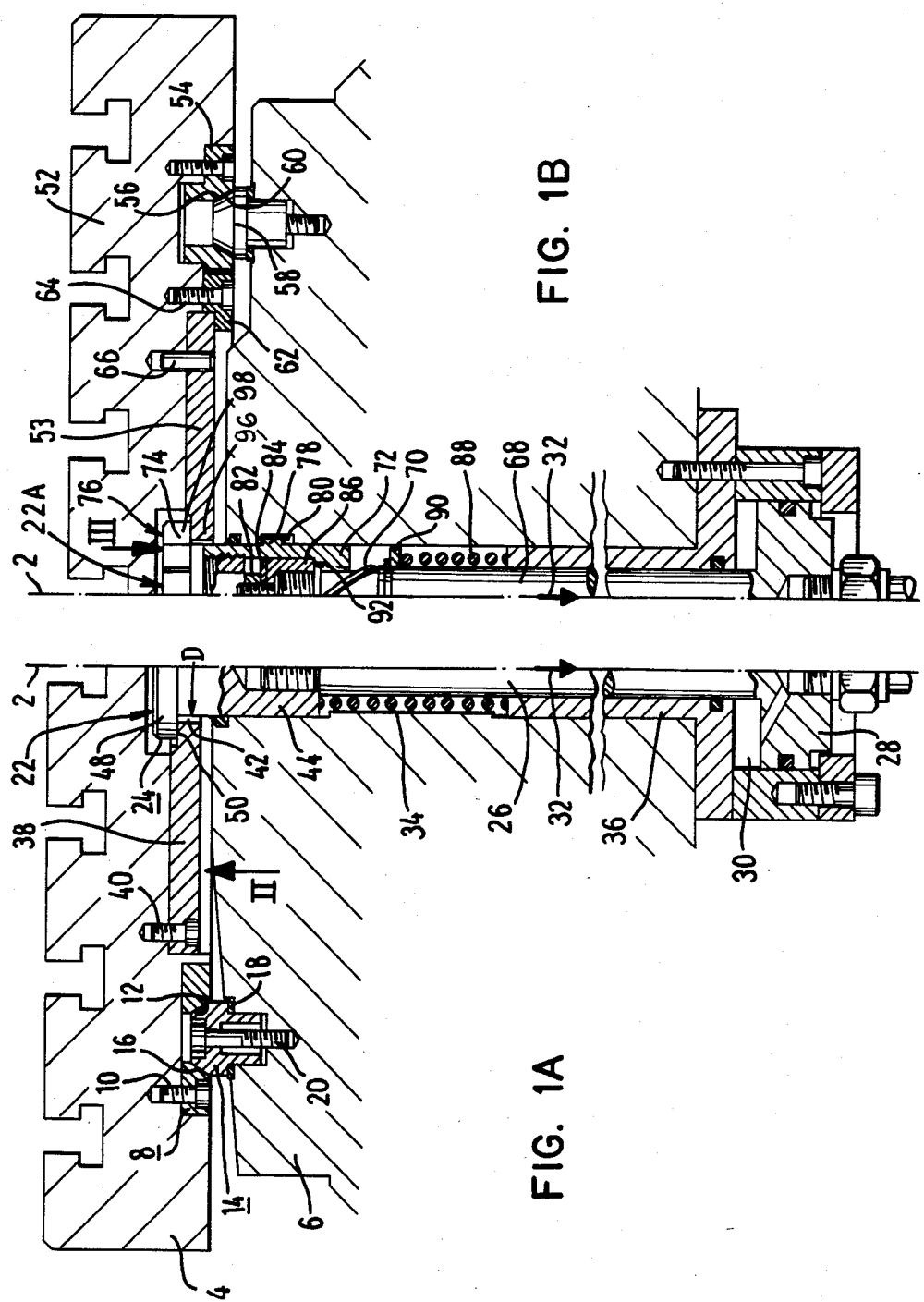
FIG. 1A is a cross-sectional view of a first embodiment of a machine table and a clamping device.
FIG. 1B is a cross-sectional view of a second embodiment of a machine table and a clamping device.

FIG. 1A illustrates, on the left of the line of symmetry 2, a machine table 4 which functions as a change pallet. Same can be prepared for example at a work clamping station, namely, the table 4 can be provided with a workpiece. Thereafter the table 4 can be moved to one, or successively to several work processing machines. The machine table 4 is for this purpose moved over the machine frame 6 by means of suitable transport devices or cranes and is then set down on the machine frame 6. Special insert pieces 8 are secured by means of screws 10 to the underside of the machine table 4. Precisely worked bearing surfaces 12 are provided on the insert pieces 8. Support pins 14 are mounted on the upper side of the machine frame 6 and have support surfaces 16 thereon which are each complementary to the bearing surfaces 12 on the insert pieces 8. The support pins 14 are precisely adjustable in their height by the use of shims or washer rings 18 which are clamped between the support pins 14 and the frame 6 by means of screws 20. To adequately support the machine table, three or more support pins, for example, are to be provided.

To clamp the machine table 4 on the machine frame 6, a centrally disposed clamping device 22 is provided. The clamping device 22 consists of an elongated, vertically extending tie rod 26 having an enlarged clamping head 24 at the upper end thereof. In this embodiment, the tie rod 26 is threadedly coupled to the shank portion 44 of the clamping head 24.

The tie rod 26 has a hydraulic piston 28 mounted thereon adjacent its lower end, which can be tensioned in the direction of the Arrow 32 by means of a pressure medium which is introduced into a cylinder chamber 30 on the upper side of the piston 28. To release the clamping device 22, the cylinder chamber 30 is again depressurized. A pressure spring 34, which surrounds the tie rod 26, has one end thereof resting against the clamping head 24 and the other end resting against a sleeve 36 which is arranged on the machine frame, and effects a lifting of the clamping head 24 so that the machine table 4 can again be removed.

Figure 2:
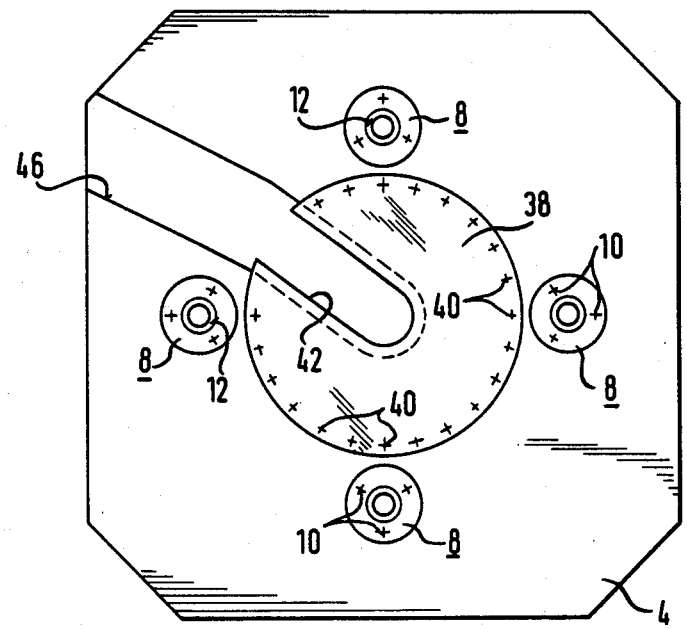
FIG. 2 illustrates a view in direction of the Arrow II of FIG. 1A in a reduced scale.

The clamping head 24 is coupled to plate 38 which is constructed as a circular disk which is secured on the underside of the machine table 4 by means of plural screws 40 (See also FIG. 2). The plate 38 has a slot 42 which extends radially outwardly from its center, the width of which slot is slightly greater than the diameter D of the shank 44 of the clamping head 24. The underside of the machine table 4 has a slot 46 therein which is aligned with the slot 42. The slot 46 extends from the edge of the plate 38 to the table edge. Further, the width of the slot 46 is slightly greater than the actual diameter of the head portion 48 of the clamping head 24. The machine table 4 can be swung or moved laterally on a specified path into its operating position and can then be set down, whereby the clamping head 24 is guided into the aligned slots 42, 46. During a clamping of the clamping device 22 (i.e., tensioning of the tie rod 26), the head portion 48 rests on the precisely worked edge 50 which is constructed along the edges of the slot 42 and draws the plate 38 toward the machine frame 6. The plate 38, which is constructed as rigidly as possible, transmits the clamping force through the screws 40 outwardly into the area of the bearing surfaces 12, whereat the machine table is supported so that a bending of the machine table in its center area is avoided.

FIG. 1B illustrates on the right side of the line of symmetry 2, a machine table 52 having a plate 53 which is secured on its underside. The machine table 52 has also insert pieces 54 with bearing surfaces 56 thereon and which rest on the support surfaces 60 provided on support pins 58. The plate 53 is secured to the table 52 by a clamping ring 62, which in turn is coupled to the machine table 52 by plural screws 64. In this manner, bending of the plate 53 in the region of the fastening location to the machine table and the resulting deformation is avoided. A locating dowel or pin 66 prevents a rotation of the plate 53 relative to the table.

A clamping device 22A consists of a tie rod 68 which has adjacent its upper end a flat thread 70, on which a sleeve 72 is rotatably arranged. The sleeve 72 has an enlarged head portion 74 to which is threadedly secured an enlarged clamping head 76. The sleeve 72 has a cam 78 thereon received in slotlike recess 80 such that the clamping device 76 in the released, upper position cannot fall downwardly, as it does not need to be illustrated in any greater detail. A pressure piece 86 is secured on the tie rod 68 at the upper end by a nut 82 and an adjusting ring 84. The operation of the clamping device 76 is as follows:

To release the clamping device, the cylinder chamber, as already described, is depressurized, so that the pressure spring 88 moves the tie rod 68 upwardly through the pressure ring 90. The sleeve 72 is thereby first carried along, whereby the cam 78 is guided in such a manner in the slotlike recess that the sleeve 72 does not rotate. When the cam 78 hits an upper stop in the slotlike recess, the further upward movement of the tie rod effects a rotation of the sleeve 72 with the head portion 74 through about 90°, whereby the bayonetlike connection of the head portion 74 with the plate 53 is released, as will yet be described. The machine table can then be lifted upwardly off the frame. During a clamping of the tie rod in direction of the Arrow 32, the sleeve 72 is rotated back over the flat thread 70 (see FIG. 3), until the cam 78 becomes free to move downwardly; however, is prevented from further rotation; at the same time the pressure piece 86 rests with its underside on the inner collar 92 of the sleeve 72 and carries same along, so that it clamps the machine table through the plate 53.

Figure 3:
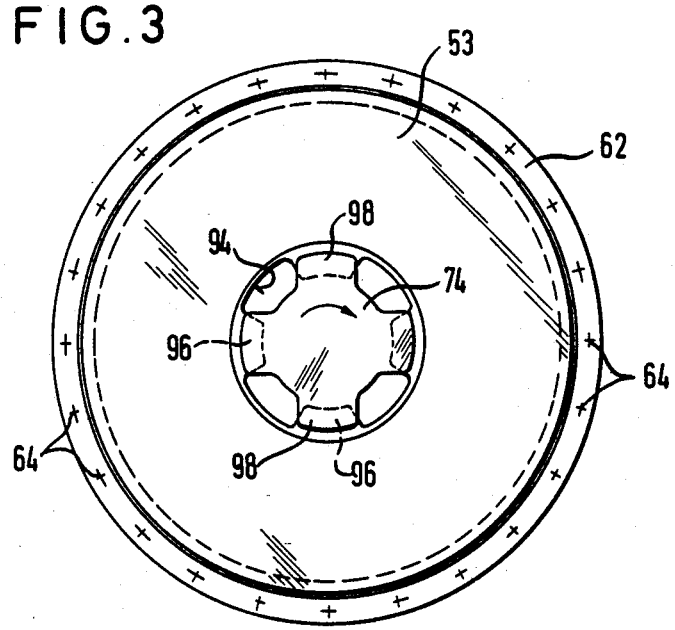
FIG. 3 illustrates a view in direction of the Arrow III of FIG. 1B.

FIG. 3 illustrates the plate 53 in a top view corresponding with the Arrow III. The plate 53 has a center opening 94 with several radial projections 96, behind which grip in a conventional manner shoulders 98 which are constructed on the head portion 74 which is rotatable at 90°.

Figure 4:
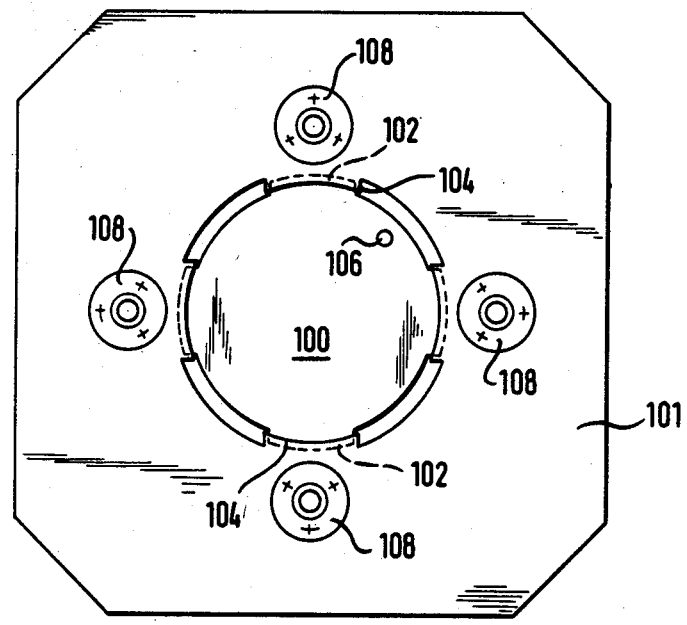
FIG. 4 is an illustration according to FIG. 2 with a different embodiment of the plate for transmitting the clamping force.

FIG. 4 illustrates a view generally similar to FIG. 2. However, the plate 100 is, however not coupled by screws to the machine table 101, but is connected with its bayonetlike constructed outer edge 102 on the correspondingly constructed inner edge 104 of the machine table 101. An adjusting pin 106 secures the plate against rotation. In this construction, the forces are transmitted from the plate 100 mainly in the area of the four support pins 108 onto the machine table 101, so that an almost complete assurance against bending of the table plate is provided. The transfer of the tensioning force from the clamping device onto the plate 100 occurs as in the case of the plate 53 (FIG. 1B and FIG. 3) through a bayonet connection. The corresponding recess in the plate 100 for insertion of enlarged head 74 of the clamping device 22A is not illustrated for the purpose of a better clarity.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property of privilege is claimed are defined as follows:

1. In a combination of a machine table and a machine frame, clamping means for clamping said machine table to said machine frame, said machine table having plural rigid bearing surfaces spaced from a center of said machine table and on an underside thereof, said machine frame having plural upwardly facing and rigid support surfaces on which rest said bearing surfaces, said clamping means being centrally located and engaging said underside of said machine table, the improvement comprising wherein said clamping means includes a force transmitting means for transmitting a tensioning force onto said bearing surfaces of said machine table, said force transmitting means comprising a plate-like member connected to said underside of said machine table and which has in its center area a means for operatively engaging said clamping means.

2. The combination of a machine table and a machine frame according to claim 1, wherein said plate-like member is a circular disk, an outer edge of which is secured to said underside of said machine table, and wherein said circular disk has a central opening into which opening said clamping means is received, wherein said means for operatively engaging said clamping means includes a bayonetlike structure around said opening and wherein said clamping means is provided with an enlarged bayonet head means which is automatically rotatable during a tensioning or releasing of said clamping means to couple or uncouple said bayonet head means and said bayonetlike structure.

3. The combination of a machine table and a machine frame according to claim 1, wherein said plate-like structure is a radially slotted circular disk, an outer edge of said disk being secured to said underside of said machine table, and wherein said clamping means is provided with an enlarged head having an edge thereon which extends over edges of said slot.

4. The combination of a machine table and a machine frame according to claim 1, wherein said plate-like member is secured by screws to said underside of said machine table.

5. The combination of a machine table and a machine frame according to claim 1, wherein said plate-like member is secured to said underside of said machine table by a clamping ring, which in turn is held on said machine table by means of screws.

6. The combination of a machine table and a machine frame according to claim 1, wherein said plate-like member is connected by a bayonentlike coupling to said machine table.

7. The combination of a machine table and a machine frame according to claim 1, wherein said force transmitting means on said clamping means further includes an elongated tie rod having a piston on a portion remote from said plate-like member, said piston being reciprocally received in a chamber, a movement of said piston in said chamber and away from said plate-like member causing said tie rod to pull on said plate-like member at the central portion thereof to draw said bearing surfaces into engagement with said support surfaces.

* * * * *